United States Patent [19]

Groff et al.

[11] Patent Number: 4,903,669
[45] Date of Patent: Feb. 27, 1990

[54] METHOD AND APPARATUS FOR CLOSED LOOP FUEL CONTROL

[75] Inventors: Edward G. Groff, Troy; Arun S. P. Solomon, Utica; Stephen F. De Nagel, Warren, all of Mich.

[73] Assignee: General Motors Corporation, Detroit, Mich.

[21] Appl. No.: 332,204

[22] Filed: Apr. 3, 1989

[51] Int. Cl.$^4$ .............................................. F02D 41/14
[52] U.S. Cl. .................... 123/478; 123/494; 73/119 A
[58] Field of Search ............... 123/357, 446, 478, 480, 123/494; 73/119 A

[56] References Cited

U.S. PATENT DOCUMENTS

| | | | |
|---|---|---|---|
| 4,372,266 | 2/1983 | Hiyama et al. | 123/494 X |
| 4,428,354 | 1/1984 | Sundeen et al. | 123/568 |
| 4,483,480 | 11/1984 | Yasuhara | 73/119 A X |
| 4,502,438 | 3/1985 | Yasuhara | 123/494 X |
| 4,838,080 | 6/1989 | Okano | 73/119 A |
| 4,844,035 | 7/1989 | Takagi | 123/494 X |

FOREIGN PATENT DOCUMENTS

| | | | |
|---|---|---|---|
| 2756053 | 6/1978 | Fed. Rep. of Germany | 73/119 A |
| 0087238 | 5/1984 | Japan | 123/478 |
| 2086985 | 5/1982 | United Kingdom | 123/478 |

*Primary Examiner*—Willis R. Wolfe
*Attorney, Agent, or Firm*—Howard N. Conkey

[57] ABSTRACT

In an engine having direct fuel injection or injection at individual intake ports, the fuel injectors are of the positive displacement type and are equipped with plunger displacement sensors to yield a displacement signal representing the quantity of fuel injected. This signal is used as feedback to a closed loop PID control which compares the injected quantity to a demand quantity to determine an error and calculates a control pulsewidth which reduces the error eventually to zero. An open loop injector calibration of pulsewidth versus approximate fuel quantity is used as a base pulsewidth to which the closed loop adds a correction value.

8 Claims, 3 Drawing Sheets

FIG 1
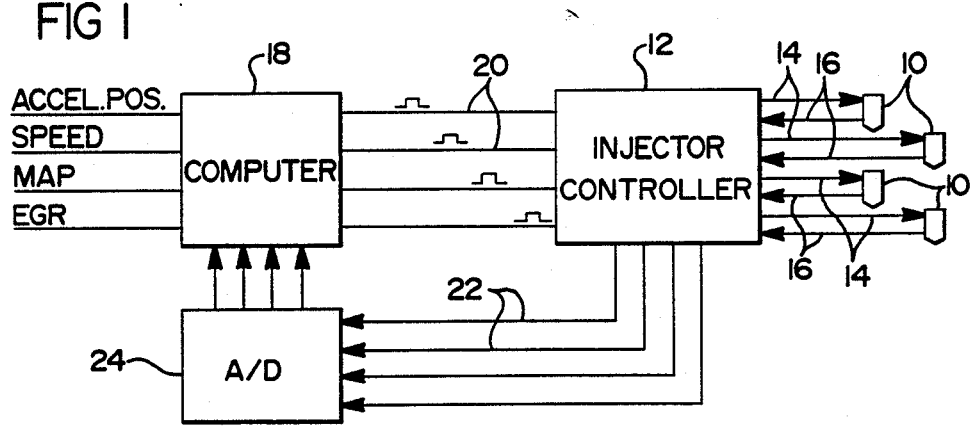
FIG 2
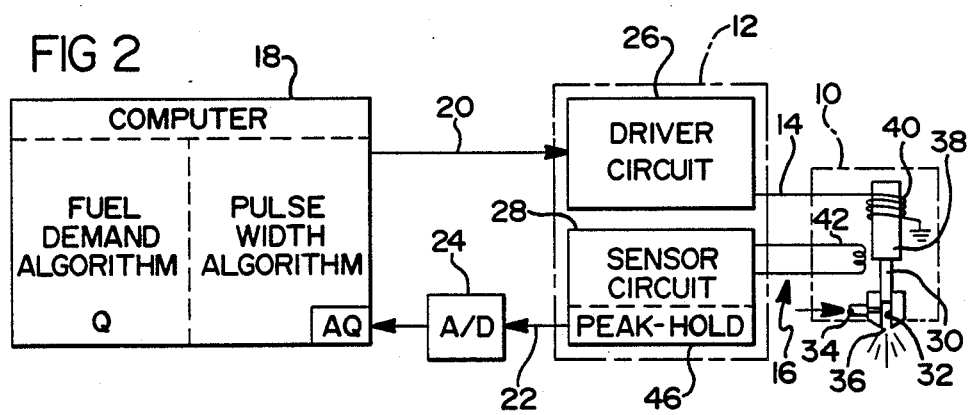
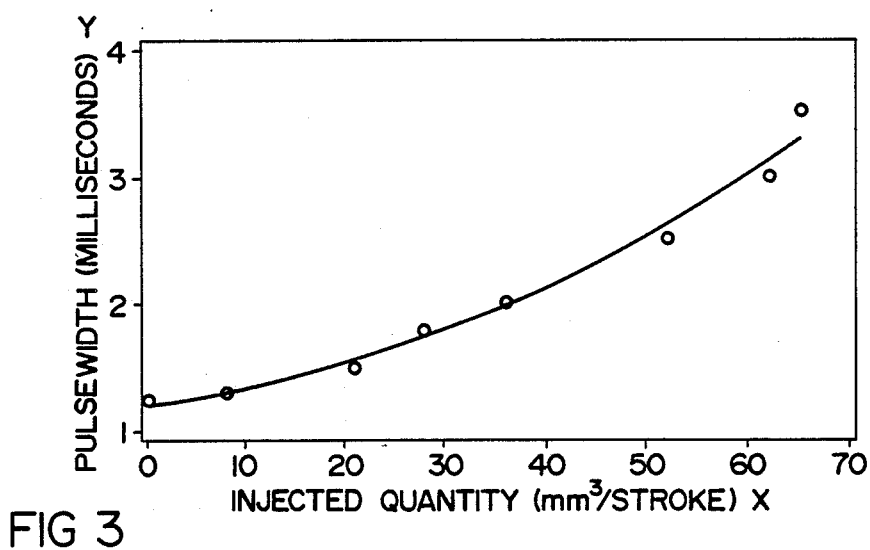
FIG 3

METHOD AND APPARATUS FOR CLOSED LOOP FUEL CONTROL

FIELD OF THE INVENTION

This invention relates to fuel control for a fuel injected engine and particularly to a method and apparatus for a closed loop fuel control.

BACKGROUND OF THE INVENTION

The control of internal combustion engines by microcomputer based controls has become commonplace and has made possible the calculation of optimum fuel quantity to be delivered to each individual cylinder. The use of fuel injectors for direct injection into the cylinders or at the intake port of each cylinder provides a practical means of delivering fuel to each cylinder. Prior to this invention only open loop fuel control has been used for the lack of an ability to measure the actual amount of fuel delivered by an injector. Therefore injectors were calibrated when new to correlate the injector control signal with the amount of fuel injected. Such calibrations are approximate because the injection amount varies with engine operating conditions and with age and wear on the injector. As a result, the actual delivery is not known and there is a tendency for the fuel quantity to deviate from the calculated value.

There are advantages to controlling the fuel to the individual cylinders. For example, such control would make fuel balancing possible, i.e., equal amounts of fuel could be delivered to all cylinders. Conversely, deliberate variances of fuel delivery could be accurately managed if available control parameters required that for the best operation.

SUMMARY OF THE INVENTION

It is therefore an object of the invention to provide a method and apparatus for closed loop fuel control. It is a further object to provide such control on an individual fuel injector basis.

The invention is carried out by means for controlling the fuel quantity delivered by a fuel injector to an engine comprising: a positive displacement fuel injector activated by a control signal and having a plunger which moves in proportion to the amount of fuel delivered, means for measuring plunger displacement and generating a displacement signal representing fuel quantity, command means for generating a desired fuel signal representing desired fuel quantity, control means responsive to the desired fuel signal for generating the control signal to activate the injector for effecting a fuel delivery, and the control means including a closed loop means responsive to the desired fuel signal and the displacement signal for adjusting the fuel delivery to the engine to match the actual quantity to the desired quantity.

The invention is further carried out by the method of controlling the fuel quantity delivered to an engine by a fuel injector having a positive displacement plunger comprising the steps of: calibrating the plunger displacement versus fuel quantity, generating a command value representing the desired fuel quantity, pulsing the fuel injector by a pulsewidth modulated control signal to deliver fuel to the engine, measuring the displacement of the plunger, computing the fuel quantity from the displacement in accordance with the calibration, comparing the fuel quantity to the command fuel value to determine an error, and adjusting the control signal pulsewidth to reduce the error so that the injected fuel quantity substantially equals the command fuel value.

BRIEF DESCRIPTION OF THE DRAWINGS

The above and other advantages of the invention will become more apparent from the following description taken in conjunction with the accompanying drawings wherein like references refer to like parts and wherein:

FIG. 1 is a schematic diagram of a fuel injector control circuit with each fuel injector having a feedback sensor according to the invention, FIG. 2 is a control circuit and injector schematic for the system of FIG. 1, FIG. 3 is a pulsewidth versus injected fuel quantity calibration curve.

DESCRIPTION OF THE PREFERRED EMBODIMENT

Figure 4:
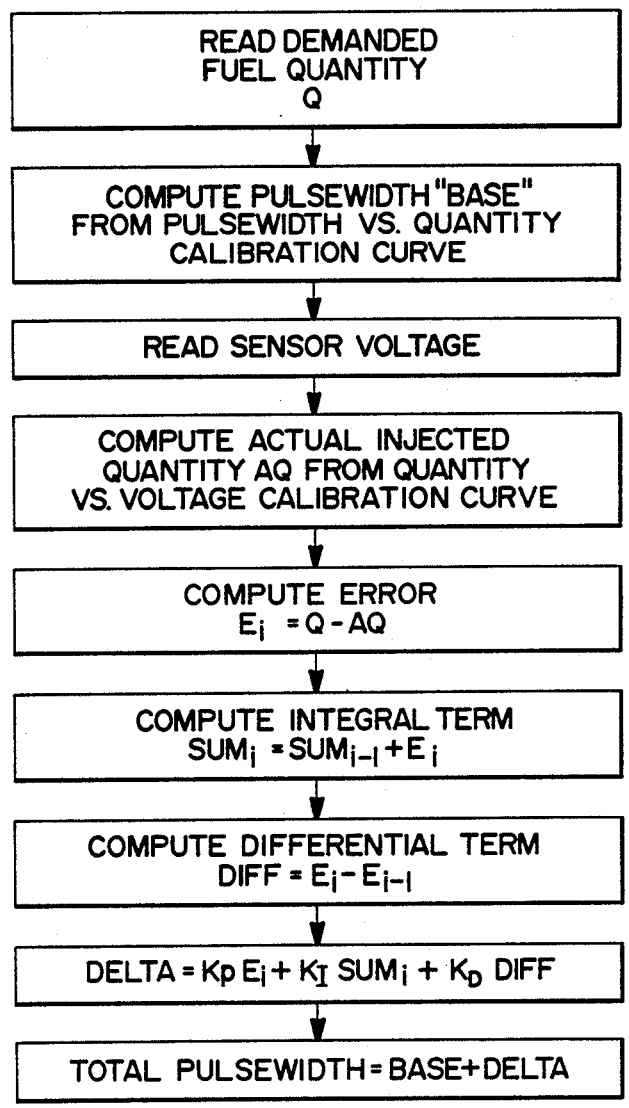
FIG. 4 is flow diagram of the closed loop fuel control process according to the invention.

The ensuing description is for a fuel injection system developed specifically for a direct-injection stratified-charge engine. It is expected that the same principles or even the same circuit will apply to other engines having port fuel injection for each cylinder, as well as to diesel engines. The system is predicated upon the availability of a fuel injector having a plunger movement substantially proportional or at least precisely calibrated to the amount of fuel delivered and to a sensor coupled to the fuel injector for measuring the plunger movement, thus providing feedback information on the actual fuel amount. The invention is not directed to the specific structure of such an injector/sensor but rather is directed to the method and the system using the properties of that type of injector.

FIG. 1 illustrates the system as applied to a four cylinder engine with a fuel injector 10 for each cylinder. Each injector is coupled to an injector controller 12 by a control line 14 and a feedback line 16. An engine control computer 18 has a number of inputs including but not limited to accelerator position, engine speed, manifold absolute pressure (MAP), and an EGR signal. The computer issues four output pulses on lines 20 for each injector. The pulses are timed for correct application to the injectors 10 and are coupled through the injector controller 12. The widths of the pulses determines the fuel quantity delivered by the injectors. The challenge in such a control is to tailor each pulsewidth to a value which results in the precise desired fuel quantity. The feedback is used for that purpose. The feedback lines 16 from the injectors carry signals which are processed by the injector controller 12 and are fed back to the computer via lines 22 and an analog to digital converter 24.

FIG. 2 relates to just one channel of the system which is sufficient to control one injector and more fully illustrates the source of the feedback information. The injector controller 12 includes a driver circuit 26 which processes the pulsewidth signal on line 20 to output an injector actuating pulse on line 14 and a sensor circuit 28 which processes the sensor signal on line 16. The injector 10 is of the positive displacement type having a plunger 30 in a bore 32 which is filled with fuel from a fuel line 34 and has an orifice or spring loaded valve 36 for emitting the fuel when the plunger is stroked in the bore.

The amount of plunger displacement is directly proportional to the amount of fuel delivered. The plunger is operated by an armature 38 which is controlled by a solenoid 40. The control pulse on line 14 energizes the solenoid 40 to move the armature 38 and plunger 30. The wider the pulse on line 14 the further the plunger is displaced and the greater the fuel amount. The fuel amount is not, however, directly proportional to the pulsewidth. The injector must be calibrated at several pulsewidths for at least approximate fuel amounts to derive a pulsewidth versus fuel amount calibration curve. The direct plunger actuation by a solenoid is only an example of a fuel injection mechanism responsive to an electrical pulse. Another example is a plunger operated by hydraulic pressure which in turn is controlled by an electrically operated valve. In any event, the plunger movement is measured by a sensor, shown in the drawings as an LVDT 42 responsive to the armature position. The LVDT is coupled to a sensor circuit 28 in the controller 12 which develops a voltage proportional to armature position with respect to some reference point. A peak-hold circuit 46 retains the maximum voltage of the sensor circuit and this value is sent to the computer 18 as representing the maximum plunger displacement and thus the actual fuel amount. In the event that the fuel amount is not exactly proportional to the measured displacement, a second calibration curve of fuel amount versus sensor voltage is made.

Both calibration curves, i.e. pulse width versus fuel quantity and fuel quantity versus sensor voltage, are stored in the computer 18 in the form of equations. FIGS. 3 illustrates the pulsewidth versus fuel quantity calibration curve. This is a typical curve empirically determined for a particular injector and is represented by the polynomial $BASE = 1.257 + 0.00412Q + 0.000425Q^2$, where BASE is the base pulsewidth in milliseconds and Q is the injected quantity in mm³/stroke. The actual injected quantity AQ versus voltage V for the same injector is a straight line represented by $AQ = -27.1398 + 23.744V$.

The computer 18 has a fuel demand algorithm for calculating the desired fuel quantity Q and a pulsewidth algorithm responsive to the quantity Q and the sensor feedback signal representing actual fuel quantity AQ to calculate the pulsewidth necessary to eliminate the error, i.e. the difference between Q and AQ. The fuel demand algorithm may be any of the well known fuel control programs in common usage. The pulsewidth algorithm is set forth in the flow chart of FIG. 4. That program reads the desired quantity Q as determined by the fuel demand algorithm, computes the pulsewidth BASE from the equation for the pulsewidth versus fuel calibration curve, reads the sensor voltage and computes the actual quantity AQ from the equation for the voltage versus fuel quantity calibration. Next, the fuel error is computed as $E_i = Q - AQ$ (where the subscript i refers to the present engine cycle) and a proportional-integral-differential control is implemented by computing the integral term $SUM_i = SUM_{i-1} + E_i$, computing the differential term $DIFF = E_i - E_{i-1}$, and computing the DELTA term from $DELTA = K_P E_i + K_I SUM_i + K_D DIFF$. Finally the BASE and DELTA solutions are added to yield the corrected value TOTAL PULSEWIDTH which is the control value sent to the injector controller. The constant $K_P$ for the proportional term is determined from the differential of the pulsewidth versus fuel quantity curve at a point midway between the values of Q and AQ and multiplying by a constant, i.e. $K_P = K(0.00412 + 0.00085 Q_a)$ where $Q_a = (Q + AQ)/2$. The values of K, $K_I$ and $K_D$ are determined empirically.

If the pulsewidth versus fuel quantity calibration were precise and if the injection could be faithfully executed without deviation from the calibrated values under every engine condition the closed loop system would not be necessary. In practice, however, it has been demonstrated that even the precise calibration changes with age and wear but it does form a workable starting place for the closed loop system. That is, the initial engine cycle upon starting requires some reasonable fuel quantity for successful combustion. A test sequence for a four cylinder engine having crudely calibrated injectors illustrates this point and further illustrates the effectiveness of the closed loop fuel control.

Figure 5:
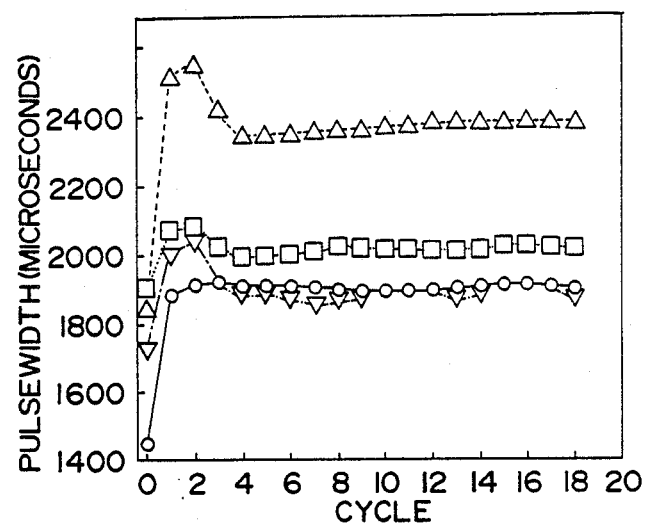
FIG. 5 is a diagram of pulsewidth versus cycle number for a test run on a four cylinder engine.
Figure 6:
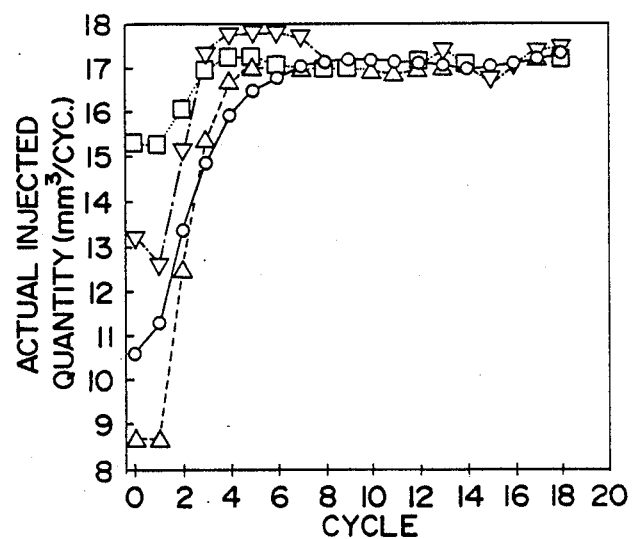
FIG. 6 is a diagram of injection quantity versus cycle number for the same engine test as FIG. 5.

The test is documented in FIG. 5 which charts pulsewidth for each injector versus the engine cycle and FIG. 6 which charts AQ for each injector, as measured by sensor voltage, versus engine cycle. In FIG. 5, the fuel demand quantity is a constant 17.1 mm³ per stroke and the calibration curves for that value yielded pulsewidths ranging from 1450 to 1900 microseconds for the several cylinders for the 0th cycle which operates open loop. During that cycle the default value of the AQ feedback signal is zero so that the BASE pulsewidth is not adjusted. FIG. 6 for the same condition indicates that the corresponding AQ, as calculated from sensor voltage after the injection event, ranges from 8.6 to 15.3 mm³. This was adequate for engine starting. The closed loop then was effective for subsequent cycles and the AQ quickly reached the goal of 17.1 mm³ for all cylinders, thus showing the effectiveness of the control. FIG. 5 shows that when stabilized, the pulsewidths ranged from 1880 to 2380 microseconds which reflects the responses of individual injectors to the control pulses.

The embodiments of the invention in which an exclusive property or privilege is claimed are defined as follows:

1. Means for controlling the fuel quantity delivered by a fuel injector to an engine comprising:
   a positive displacement fuel injector activated by a control signal and having a plunger which moves in proportion to the amount of fuel delivered,
   means for measuring plunger displacement and generating a displacement signal representing fuel quantity,
   command means for generating a desired fuel signal representing desired fuel quantity,
   control means responsive to the desired fuel signal for generating the control signal to activate the injector for effecting a fuel delivery, and
   the control means including a closed loop means responsive to the desired fuel signal and the displacement signal for adjusting the fuel delivery to the engine to match the actual quantity to the desired quantity.

2. The invention as defined in claim 1 wherein the closed loop means includes means for comparing the actual quantity and desired quantity to determine an error, and
   a proportional-integral-differential control for reducing the error to zero.

3. The invention as defined in claim 2 wherein the injector is calibrated to generate a curve of pulsewidth versus approximate fuel quantity and the control signal is a pulsewidth modulated signal, and the control means includes means for calculating a factor of a proportional term in the control by differentiating the calibration curve at a point between the desired fuel quantity and the actual fuel quantity.

4. The method of controlling the fuel quantity delivered to an engine by a fuel injector having a positive displacement plunger comprising the steps of:

calibrating the fuel quantity versus plunger displacement, generating a command value representing the desired fuel quantity, pulsing the fuel injector by a pulsewidth modulated control signal to deliver fuel to the engine, measuring the displacement of the plunger, computing the fuel quantity from the displacement in accordance with the calibration, comparing the fuel quantity to the command fuel value to determine an error, and adjusting the control signal pulsewidth to reduce the error so that the injected fuel quantity substantially equals the command fuel value.

5. The invention as defined in claim 4 wherein the control signal is adjusted by the steps of:

establishing a base pulsewidth, determining a term proportional to the error, determining a term representing the sum of the errors in successive control cycles, determining a term representing the rate of change of errors, and adjusting the base pulsewidth by the sum of the said terms.

6. The invention as defined in claim 5 wherein the base pulse width is determined by the steps of:

calibrating the injector to determine a curve for approximate fuel quantity versus pulsewidth, and selecting a base pulsewidth from the calibration curve based on the desired fuel quantity.

7. The invention as defined in claim 6 including determining a factor of the proportional term by the steps of:

calculating the slope of the said curve midway between the actual fuel quantity and the desired fuel quantity, and multiplying the slope by a constant, whereby the proportional term is dependent on the fuel quantity as well as the error.

8. The method of controlling the fuel quantity delivered to an engine by a fuel injector having a positive displacement plunger responsive to a pulsewidth modulated control signal, comprising the steps of:

calibrating the fuel quantity versus plunger displacement, calibrating the control pulsewidth versus approximate fuel quantity to generate a calibration curve, generating a command signal representing the desired fuel quantity, calculating the pulsewidth of the control signal as a function of the desired fuel quantity and the calibration curve, pulsing the fuel injector by the pulsewidth modulated control signal to deliver fuel to the engine, measuring the displacement of the plunger, computing the fuel quantity from the displacement in accordance with the calibration of fuel quantity versus displacement, comparing the fuel quantity to the command fuel value to determine an error, and adjusting the control signal pulsewidth to reduce the error by applying a proportional-integral-differential algorithm to the error so that the injected fuel quantity substantially equals the desired fuel value.

* * * * *